(12) United States Patent
Szedo et al.

(10) Patent No.: US 8,572,148 B1
(45) Date of Patent: Oct. 29, 2013

(54) DATA REORGANIZER FOR FOURIER TRANSFORMATION OF PARALLEL DATA STREAMS

(75) Inventors: Gabor Szedo, San Jose, CA (US); Hemang Parekh, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1282 days.

(21) Appl. No.: 12/391,231

(22) Filed: Feb. 23, 2009

(51) Int. Cl.
*G06F 15/00* (2006.01)

(52) U.S. Cl.
USPC ............ 708/404; 708/403; 708/406; 708/408

(58) Field of Classification Search
None
See application file for complete search history.

(56) References Cited

U.S. PATENT DOCUMENTS

| | | | | |
|---|---|---|---|---|
| 3,704,826 A | * | 12/1972 | Constantin | 708/404 |
| 3,731,284 A | * | 5/1973 | Thies | 708/200 |
| 5,091,875 A | * | 2/1992 | Wong et al. | 708/404 |
| 5,297,070 A | * | 3/1994 | Hua et al. | 708/404 |
| 5,365,470 A | * | 11/1994 | Smith | 708/406 |
| 6,081,821 A | * | 6/2000 | Hopkinson et al. | 708/406 |
| 6,408,319 B1 | * | 6/2002 | Cambonie | 708/406 |
| 6,430,587 B1 | * | 8/2002 | Orling | 708/404 |
| 6,609,140 B1 | * | 8/2003 | Greene | 708/404 |
| 6,687,315 B2 | | 2/2004 | Keevill et al. | |
| 7,047,268 B2 | * | 5/2006 | Harley et al. | 708/404 |
| 7,415,584 B2 | * | 8/2008 | Gibb et al. | 711/157 |
| 7,543,010 B2 | * | 6/2009 | Swartzlander et al. | 708/404 |
| 2002/0083107 A1 | * | 6/2002 | Park et al. | 708/404 |
| 2003/0149849 A1 | * | 8/2003 | Kim et al. | 711/157 |
| 2003/0154343 A1 | * | 8/2003 | Yokokawa | 711/5 |
| 2003/0222886 A1 | * | 12/2003 | Wilson | 345/605 |

FOREIGN PATENT DOCUMENTS

GB          1330700 A   *   9/1973

OTHER PUBLICATIONS

Newton, H., Newton's Telecom Dictionary, 19th Edition, CMP Books, 2003, p. 638, "Programmable Logic".
U.S. Appl. No. 11/527,802, filed Sep. 27, 2006, Parekh, H. et al., Xilinx, Inc., 2100 Logic Drive, San Jose, CA.

* cited by examiner

*Primary Examiner* — Lewis A Bullock, Jr.
*Assistant Examiner* — Christine Dang
(74) *Attorney, Agent, or Firm* — W. Eric Webostad

(57) ABSTRACT

A data reorganizer for Fourier Transforms, both forward and inverse, of multiple parallel data streams input to an integrated circuit, and method for use thereof, are described. The data reorganizer has a k input commutator, for k a positive integer greater than zero; an address generator; memory buffers; and an output commutator.

14 Claims, 7 Drawing Sheets

DATA REORGANIZER FOR FOURIER TRANSFORMATION OF PARALLEL DATA STREAMS

FIELD OF THE INVENTION

The invention relates to integrated circuit devices (ICs). More particularly, the invention relates to a data reorganizer for Fourier Transforms, both forward and inverse, of parallel data streams input to an IC.

BACKGROUND OF THE INVENTION

Various digital communications applications and standards like 802.16, WiMax, and DVB-T, among others, use Fourier Transforms as part of Orthogonal Frequency Division Multiplexing ("OFDM") systems. Various implementations of Fourier Transforms are provided in a set of algorithms called Fast Fourier Transforms ("FFTs"). FFT algorithms can be implemented using radix-2, radix-4, etc. algorithms. Both the forward FFT and the inverse FFT ("IFFT") change the order of data frames provided as input to these algorithms. For example, if the input data to an FFT block is in natural order, as for Decimation In Frequency ("DIF") type FFTs, the output from the FFT block is in bit- or digit-reversed order. Similarly, if the input data to the FFT block is provided in bit- or digit-reversed order, as for Decimation in Time ("DIT") type FFTs, then the output data of FFT block is in natural order. Radix-2 DIF algorithms output data in bit-reversed order, while for higher radix implementations, digit-reversed ordering is the form of the output.

Bit-reversed order is based on a binary number representation of an index. A 16-point FFT block has 16 data values with indices 0, 1, 2, 3 . . . , 14, 15. These indices are represented in binary as 0000, 0001, 0010, . . . , 1110, 1111. A bit-reversed indexing reverses the order of such bits. So a natural index of 0000, 0001, 0010, . . . , 1110, 1111 has a corresponding bit-reversed order of 0000, 1000, 0100, . . . , 0111, 1111 which translates in decimal to indices of 0, 8, 4, 12, 2, 10, 6, 14, 1, 9, 5, 13, 3, 11, 7, 15.

Digit-reversed ordering may be thought of as a generalization of bit-reversed ordering for an arbitrary radix-k, where the order of digits are reversed for a radix-k representation of index n, for k and n positive even integers. Digit reversing for radix-4 may be thought of as rearranging of groups of 2 bits in a binary representation, so index bits are reversed in groups of 2 bits. Thus, for example, a 0110 in binary after digit-reversed ordering for radix-4 would be 1001, as the group of two bits on the far right would effectively be swapped in place for the group of two bits on the far left. Similarly the reverse ordering in radix-8 may be in groups of 3 bits, and so on.

SUMMARY OF THE INVENTION

One or more aspects generally relate to integrated circuit devices (ICs) and, more particularly, to a data reorganizer for Fourier Transforms, both forward and inverse, of parallel data streams input to an IC.

An aspect relates generally to a data reorganizer with: a first radix-k commutator, for k a positive even integer greater than zero; an address generator; memory buffers; and a second radix-k commutator. The first radix-k commutator is configured to receive first parallel input streams and to provide first parallel output streams. The address generator is coupled to receive a clock signal and configured to generate select signals and address signals using the clock signal. The memory buffers are coupled to respectively receive the first parallel output streams from the first radix-k commutator and to respectively receive the address signals from the address generator. The first radix-k commutator is coupled to receive a first select signal of the select signals and configured to shift position of the first parallel output streams relative to the first parallel input streams responsive to a first subset of values associated with the select signals. The first radix-k commutator is also configured to pass the first parallel input streams without shifting to provide the first parallel output streams responsive to a second subset of the values associated with the select signals, the first parallel input streams having data in a first order. The first radix-k commutator is also configured to reorder the first parallel input streams to rearrange the data via the first parallel output streams for segmented storage of the data in the memory buffers in a second order. The second order is arranged for subsequent output of each segment of the data from the memory buffers in parallel in a clock cycle. The second radix-k commutator is configured to receive second parallel input streams from the memory buffers and to provide second parallel output streams. The second radix-k commutator is coupled to receive a second select signal of the select signals and configured to shift position of the second parallel output streams relative to the second parallel input streams responsive to the first subset of values associated with the select signals. The second radix-k commutator is also configured to pass the second parallel input streams without shifting to provide the second parallel output streams responsive to the second subset of the values associated with the select signals, the second parallel input streams having data in the second order. The second radix-k commutator is also configured to reorder the second parallel input streams to rearrange the data via the second parallel output streams into a third order.

Another aspect relates generally to a method for data reorganization. First input streams having data in a first order are selectively circularly shifted to provide first output streams having the data in a second order. The data from the first output streams is stored in respective memory buffers for output. The storing includes generating addresses for addressing the memory buffers for the storing of the data. The addresses are generated in a first mode for odd frames and in a second mode for even frames for single stage buffering of parallel streams of the data in the memory buffers. The data stored in the second order in the groups is output as second input streams. The second input streams are selectively circularly shifted to provide second output streams having the data in a third order.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
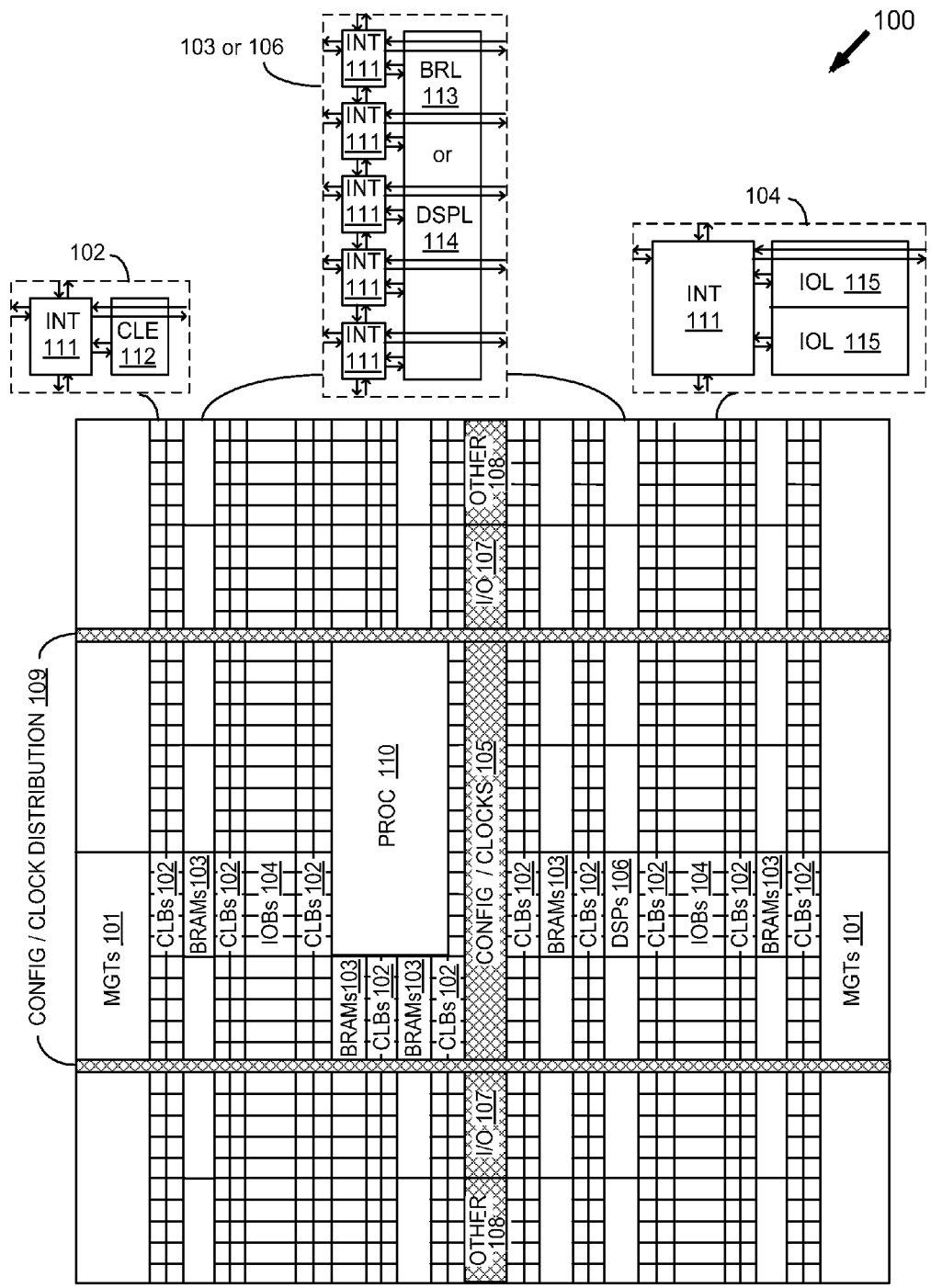
FIG. 1 is a simplified block diagram depicting an exemplary embodiment of a columnar Field Programmable Gate Array ("FPGA") architecture in which one or more aspects of the invention may be implemented.

Field Programmable Gate Arrays ("FPGAs") can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

In some Digital Communication applications, FFT and IFFT blocks access data in natural order or digit-reversed order and output such data in digit-reversed order or natural order, respectively. Hence, either at the input or at the output of such FFT and IFFT blocks, conversion of digit-reversed order to natural order, or vice versa, is to be employed as described herein. The description below is in terms of a 4-input, 4-output parallel radix-4, DIF FFT, where the output data streams are reorganized from digit-reversed to natural order. However, the scope of the disclosure is equally applicable to radix values other than 4, to both FFT and IFFT blocks, and to both DIF and DIT implementations.

Heretofore, two buffer stages were used for buffering one set of FFT outputs, while rearranging another set of FFT outputs. The size of such buffers increases with the point size of the FFT, and thus buffer memory limitations may be a limit on FFT point size. Having two buffer stages is described in additional detail in a co-pending above-mentioned patent application entitled "Method of and Circuit for Buffering Data" by Parekh et al., application Ser. No. 11/527,802, filed Sep. 27, 2006, and assigned to the same assignee hereof, which application is incorporated in its entirety herein by reference for all purposes. In that co-pending application, in addition to an embodiment with two buffer stages, an embodiment with a single memory buffer stage is described for an application having only one data input stream and only one data output stream. Such single memory buffer stage embodiment is limited to a single input data stream and a single output data stream, and thus does not support for example an FFT or an IFFT with parallel input and parallel output data streams.

The following description is for single stage buffering of multiple parallel input data streams, namely for radix-k parallel data streaming FFTs or IFFTs. Again, though a radix-4 DIF FFT is used as an example embodiment, the scope of the disclosure is not so limited.

In Table 1 below, a radix-4 DIF FFT having point size N equal to 16 for digit-reverse ordering of 4 parallel input and output streams is illustratively shown. In Table 1, inputs x0 through x3 represent four input streams in parallel, and outputs y0 through y3 represent four output streams in parallel. If data indices 0 through 3 are respectively received during four consecutive clock cycles via input stream x0, then such data indices, in order to be output in natural order during a single clock cycle via outputs y0 through y3, respectively, are reorganized as being stored in respective rows in this example of memory buffer. For purposes of clarity, reorganizing of data indices, and thus associated data, shall be described in terms of memory buffer rows, even though reorganizing via memory buffer columns may be used.

In the example of Table 1, the first row corresponding to input x0 is transposed into the fifth column for output of data indices 0 through 3 via outputs y0 through y3, respectively. The second row corresponding to input x1 is transposed into the sixth column for output, and so on. More generally for a most significant digit m, an $N=k^m$ point, radix-k streaming FFT with k parallel inputs and k parallel outputs, which after some latency associated with frame data buffering, is capable of producing a continuous flow of data frames, where each data frame is processed in N/k cycles.

Table 1 represents a digit-reversed input sequence of an $N=4^2=16$-point radix-4 DIF FFT provided as an input to a data reorganizer, which reorganizes digit-reversed data indices to a natural order for output of associated data. In both digit-reversed order and natural order, the last digit of a set of data for a frame is used as a stream selector. A stream selector identifies in which data stream index n is going to be provided. So, a 16-point FFT block has 16 data values with indices 0, 1, 2, . . . , 14, 15, and a bit reversing index reverses the order of bits representing such indices.

TABLE 1

| input x0 | 0 | 1 | 2 | 3 | | | | |
|---|---|---|---|---|---|---|---|---|
| input x1 | 4 | 5 | 6 | 7 | | | | |
| input x2 | 8 | 9 | 10 | 11 | | | | |
| input x3 | 12 | 13 | 14 | 15 | | | | |
| output y0 | | | | | 0 | 4 | 8 | 12 |
| output y1 | | | | | 1 | 5 | 9 | 13 |
| output y2 | | | | | 2 | 6 | 10 | 14 |
| output y3 | | | | | 3 | 7 | 11 | 15 |

N values of data are stored in k memory units to allow parallel access to and from the memories and at the same time guarantees that new data written to memory buffers does not overwrite data or data elements of the previous frame before such previous frame data is read out.

Figure 2:
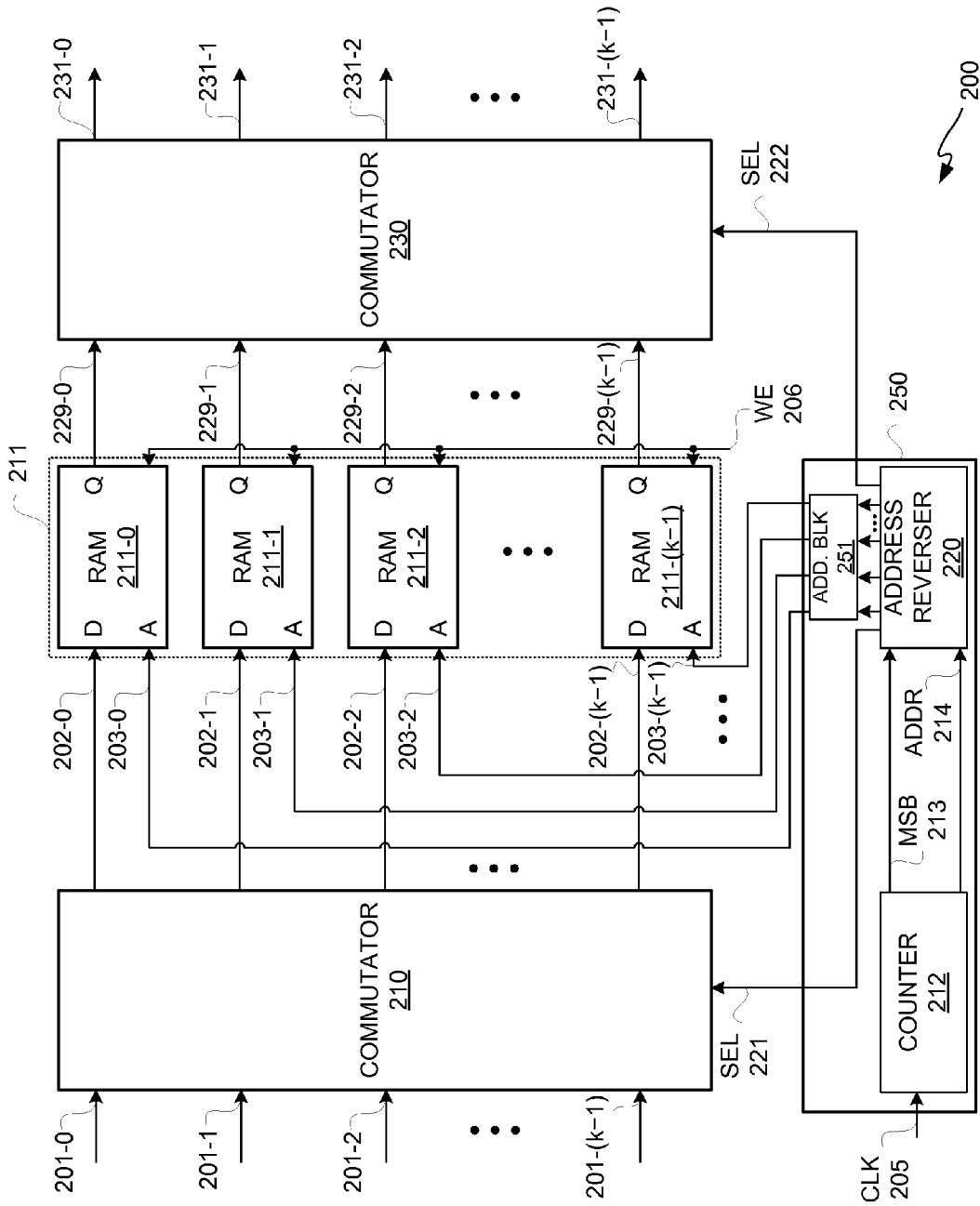
FIG. 2 is a block diagram depicting an exemplary embodiment of a data reorganizer.

FIG. 2 is a block diagram depicting an exemplary embodiment of a data reorganizer 200. Data reorganizer 200 receives k inputs, namely inputs 201-0 through 201-($k$–1) (collectively "inputs 201"), and produces k outputs, namely outputs 231-0 through 231-($k$–1) (collectively "outputs 231"). With reference to Table 1, inputs 201-0 through 201-($k$–1) may be thought of as inputs x0 through x3, respectively, and outputs 231-0 through 231-($k$–1) may be thought of as outputs y0 through y3, respectively. Thus, for the example of k equal to 4, four outputs 231 may be provided in a different order than four inputs 201 respectively associated therewith. Clock signal 205, address signal 214, MSB signal 213, and address signals 203-1 through 203-($k$–1) of FIG. 2 are described below with additional reference to Table 2.

Data reorganizer 200 includes radix-k commutator 210, radix-k commutator 230, buffer stage 211, and address generator 250. Address generator 250 includes adder block 251, counter 212, and address reverser 220. Data reorganizer 200 has multiple data input ports, and thus writes simultaneously to each of memories 211-0 through 211-($k$–1) (collectively "memories 211") of buffer stage 211. However, as data is input on parallel data streams respectively to inputs 201, each piece of such data is written to a selected one of memories 211 such that there are no collisions. In other words, commutator 210 may be configured for a one-to-one correspondence between input data streams and memories 211. Memories 211 may be random access memories, namely "RAMs" 211.

Again, for purposes of clarity by way of example and not limitation, it shall be assumed that k is equal to 4, even though other values of k may be used. If k parallel memory banks, namely RAMs 211, are written in digit-reversed order, data elements for a parallel natural order readout may not reside in the same memory bank. For example, with reference to Table 1, if input x0 were all written into RAM 211-0, then natural order parallel readout would not be possible. However, by dynamically switching between input streams as a frame is being written, such data frame may be dynamically selectively placed into different memory banks. Thus, for example, on a first clock cycle, data index 0 and associated data of input x0 may be written to one of RAMs 211, and on a next clock cycle, data 1 index and associated data of input x0 may be written to a different one of RAMs 211. In this manner, data indices and associated data may be spread among RAMs 211 for parallel readout in natural order. For purposes of clarity and not limitation data and data indices are hereinafter referred to as "data."

Data outputs 202-0 through 202-($k$–1) (collectively "data outputs 202") of commutator 210 are respectively provided to data input ports of RAMs 211-0 through 211-($k$–1). RAMs 211 may be BRAMs 103 of FPGA 100 of FIG. 1. Furthermore, commutators 210 and 230, as well as address generator 250, may be instantiated in whole or in part in programmable logic of FPGA 100. Alternatively, commutators 210 and 230, as well as address generator 250, may be manufactured as ASICs. However, the ability to instantiate circuitry in programmable logic facilitates adjusting parallel circuits for point size, radix-k value, or other scaling.

Radix-k commutators 210 and 230 are each configured to perform circular shifting on their respective input data set. The input data set for commutator 230 is provided via data inputs 229-0 through 229-($k$–1) (collectively "data inputs 229") respectively from RAMs 211-0 through 211-($k$–1). Again, RAMs 211 may be BRAMs 103 of FIG. 1, where such BRAMs are placed in a read-before-write mode of operation. In a read-before-write mode of operation, write enable signal ("WE") 206 may be used to control reads from and writes to RAMs 211.

Each commutator 210 and 230 receives a respective select ("SEL") bus, namely SEL bus 221 and SEL bus 222, respectively. By "bus," it is generally meant a collection of signals or a number of signal traces. Input select buses 221 and 222 are used to commutate output of their respective commutator. For k equal to 4, commutator 210 may be implemented as illustratively shown in FIG. 3, where select buses 221 and 222 are each 2 bits wide.

Figure 3:
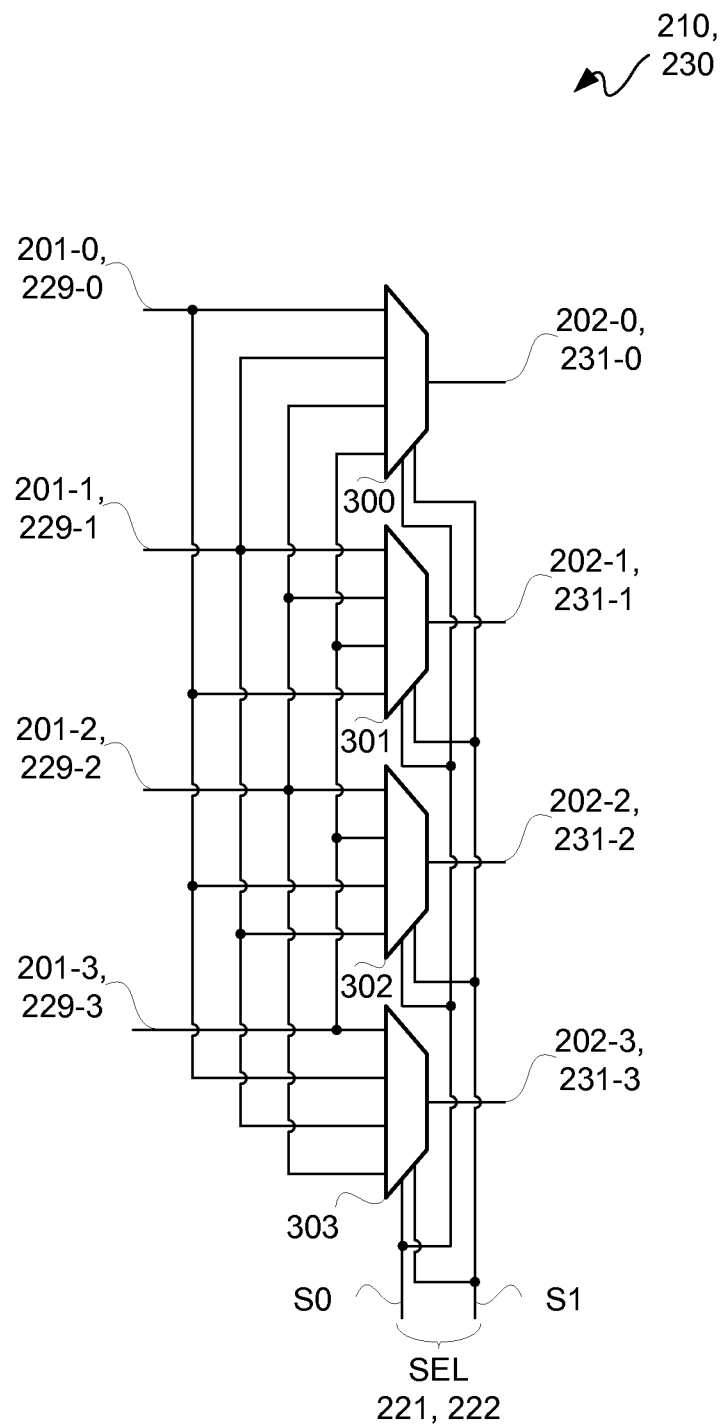
FIG. 3 is a circuit diagram depicting an exemplary embodiment of commutators of the data reorganizer of FIG. 2 for a radix-4 implementation.

FIG. 3 is a circuit diagram depicting an exemplary embodiment of commutators 210 and 230 for radix-4 commutation. With reference to both of FIGS. 2 and 3, data reorganizer 200 is further described. It should be appreciated that commutator 230 may be implemented the same as commutator 210. Accordingly, data inputs 229-0 through 229-3, select bus 222, and data outputs 231-0 through 231-3 for commutator 230 are alternatively shown respectively corresponding to data inputs 201-0 through 201-3, select bus 221, and data outputs 202-0 through 202-3 of commutator 210. The operation of each of commutators 210 and 230 is the same, and thus operation of only commutator 210 is described for purposes of clarity and not limitation.

An output i of a commutator, such as commutator 210, is assigned the value of an input as (i–SEL)mod k, where SEL indicates a value of either 0, 1, 2, or 3 for a radix-4 implementation. In other words, for a radix-4 commutation, SEL bus 221 may have one of four values, namely 00, 01, 10, or 11, for select inputs s0 and s1. Select inputs s0 and s1 are each provided to multiplexers 300 through 303 of commutators 210 and 230, respectively. Each of multiplexers 300 through 303 is a four-input multiplexer, and each of multiplexers 300 through 303 is coupled to receive each of input signals 201-0 through 201-3.

Depending on the value of input select bus 221, a radix-4 commutator 210 is capable of assigning four possible input configurations to its outputs. If inputs 201-0 through 201-3 were generally respectively characterized as I0 through I3, then the four possible input configurations would be (I0, I1, I2, I3), (I1, I2, I3, I0), (I2, I3, I0, I1), and (I3, I0, I1, I2). Any of these four possible input configurations could thus be respectively assigned to outputs, which may be generally characterized as (O0, O1, O2, O3). Thus, it should be appreciated that on each clock cycle of a radix-k commutator, such as either commutator 210 or 230, a circular shift on its input data set may be performed such that its output data set may be output in a desired order. Even though input of bit-reversed order is described, it should be appreciated that input of natural order may be used instead, and thus rather than output of natural order, output of bit-reversed order may be used.

Input select signal 221 is assigned a bit-reversed, most significant digit of address signal 214. For a k equal to $2^t$ embodiment, address signal 214 is generated by a (m−t+1)-bit configured counter 212 ("counter 212"), where t equals $\log_2 k$. Counter 212 receives clock signal 205, and responsive to clock signal 205 generates an MSB signal 213 and an address signal ("address") 214, both of which are provided to address reverser 220.

However, at clock cycles 4 through 7, a most significant digit of address 214 is a value of 1, which is the value of select bus 221. Responsive to a most significant digit value of 1, commutator 210 circularly shifts inputs I0 through I3 one position, such that inputs I0 through I3 respectively correspond to outputs D1, D2, D3, and D0. Thus, input data for data index 0 received on data input 201-0 to commutator 210 is output on output 202-1 for RAM 211-1. At clock cycles 8 through 11, a most significant digit of value 2 is on select bus 221, and accordingly commutator 210 circularly shifts inputs two positions. Thus, for example, input data for data index 0 on data input 201-0 obtained during clock cycle 8 is output by commutator 210 on output 202-2 for RAM 211-2. Lastly, for a most significant digit value of 3 on select bus 221, commutator 210 circularly shifts input data three positions. Accordingly, for example data for data index 0 obtained during any of clock cycles 12 through 15 on data input 201-0 is output by commutator 210 on data output 202-3 for RAM 211-3. Accordingly, for digit-reversed reorganization, a most significant digit ("digit m") and a least significant digit ("digit 0") are digits of an index which are exchanged for one another. Such position exchanging of data, along with modified memory addressing during a digit-reversed addressing mode, effectively "swaps" most and least significant digits. For the example of Table 2, RAMs 211-0 through 211-3 are assumed to be addressed in natural order. Latencies of components of data reorganizer 200 may be implementation-

TABLE 2

| CLK | 0  | 1  | 2  | 3  | 4  | 5  | 6  | 7  | 8  | 9  | 10 | 11 | 12 | 13 | 14 | 15 |
|-----|----|----|----|----|----|----|----|----|----|----|----|----|----|----|----|----|
| I0  | 0  | 4  | 8  | 12 | 1  | 5  | 9  | 13 | 2  | 6  | 10 | 14 | 3  | 7  | 11 | 15 |
| I1  | 16 | 20 | 24 | 28 | 17 | 21 | 25 | 29 | 18 | 22 | 26 | 30 | 19 | 23 | 27 | 31 |
| I2  | 32 | 36 | 40 | 44 | 33 | 37 | 41 | 45 | 34 | 38 | 42 | 46 | 35 | 39 | 43 | 47 |
| I3  | 48 | 52 | 56 | 60 | 49 | 53 | 57 | 61 | 50 | 54 | 58 | 62 | 51 | 55 | 59 | 63 |
| SEL | 0  | 0  | 0  | 0  | 1  | 1  | 1  | 1  | 2  | 2  | 2  | 2  | 3  | 3  | 3  | 3  |
| D0  | 0  | 4  | 8  | 12 | 49 | 53 | 57 | 61 | 34 | 38 | 42 | 46 | 19 | 23 | 27 | 31 |
| D1  | 16 | 20 | 24 | 28 | 1  | 5  | 9  | 13 | 50 | 54 | 58 | 62 | 35 | 39 | 43 | 47 |
| D2  | 32 | 36 | 40 | 44 | 17 | 21 | 25 | 29 | 2  | 6  | 10 | 14 | 51 | 55 | 59 | 63 |
| D3  | 48 | 52 | 56 | 60 | 33 | 37 | 41 | 45 | 18 | 22 | 26 | 30 | 3  | 7  | 11 | 15 |

Referring to the N equal to 64-point frame write operation illustratively shown with Table 2 for a radix-4 implementation, clock signal 205 may have clock cycles as indicated for example as respective columns for each of clock cycles 0 through 15 in Table 2. In Table 2, D0 through D3 respectively may be thought of as data outputs, such as outputs O0 through O3, respectively.

Input to commutator 210, as illustratively shown in Table 2, via inputs 201-0 through 201-3, namely I0 through I3, respectively, is digit-reversed. Thus on clock cycle 0, input 201-0 is data index 0, input on 201-1 is data index 16, and so forth. Thus, Table 2 illustratively shows how commutator 210 may be driven by a most significant digit provided via select bus 221 of address 214 to systematically distribute corresponding data into different memory banks. Thus, for example, for select bus 221 having a most significant digit of 0, there is no rotation in position of inputs with respect to outputs. In other words, inputs I0 through I3 respectively correspond to outputs D0 through D3 of commutator 210. Such outputs D0 through D3 correspond to data outputs 202-0 through 202-(k−1), for k equal to 4 in this example.

At clock cycles 0 through 3 for SEL having a value of zero in Table 2, there is no rotating position or circular shifting of positions of inputs with respect to outputs. Accordingly, such input data is passed from without shifting inputs 201-0 through 201-3 to RAMs 211-0 through 211-3, respectively.

dependent, and may be balanced by pipeline registers. For purposes of clarity by way of example and not limitation, latencies are not illustratively shown with respect to the tables and figures herein. However, it should be appreciated that registers may be inserted which are operated responsive to clock signal 205 for pipelined operation. Furthermore, memories used for RAMs 211 may be synchronous.

Accordingly, it should be appreciated that data may be circularly shifted such that digit-reversed data may be stored in RAMs 211-0 through 211-3 for natural order output on a single clock cycle. However, even though data is written to separate RAMs for subsequent natural order readout in a single clock cycle, it should be appreciated that the timing at which data is written to such RAMs may span multiple clock cycles in order to have all data of a subset available for natural order readout in a single clock cycle. In other words, in the example of Table 2, it takes 13 clock cycles for data 0 through 3 to be written into RAMs 211-0 through 211-3, respectively.

Thus, in order to have a single memory buffer stage 211 for handling parallel data streams, incoming data among RAMs 211-0 through 211-3 is to be distributed respectively thereto such that availability of data for simultaneous access for output is provided and such output makes available buffer space for writing of data for a next frame. As described below in additional detail, even-numbered frames are output in natural order and odd-numbered frames are output in digit-reversed order. Thus, using the above example of Table 2, even though data indices 0 through 3 are spread over multiple cycles for digit-reversed buffering, once data for data indices 0 through 3 is read out, then a natural order buffering of data indices 0 through 3 may take the place of the prior data having been previously read out.

For a k equal to $2^t$ embodiment, addresses for RAMs 211-0 through 211-(k–1) are generated by an (m–log$_2$ k+1)-bits wide counter. Again, for k equal to $2^t$, this equation may be simplified as m–t+1, or an (m–t+1)-bits wide configured counter, namely counter 212. Addresses generated by counter 212 are provided as address 214, along with an associated MSB, as indicated by MSB signal 213, to address reverser 220 for generation of address signals 203-1 through 203-(k–1) respectively provided to RAMs 211-0 through 211-(k–1), as well as generation of select signals 221 and 222. Adder block 251 may include k-bit adders, which may be used to refine address signals 203-1 through 203-(k–1) obtained from address reverser 220 prior to being sent to RAMs 211-0 through 211-(k–1), as described herein.

For a k not equal to $2^t$ embodiment, a cascade of binary counters with a maximum counter value of (k–1) may be implemented. Such cascade of binary counters would thus represent modulo k ("mod k") values. However, for purposes of clarity by way of example and not limitation, it shall be assumed that a k equal to $2^t$ embodiment is employed.

Accordingly, it should be appreciated that an address generator 250, including counter 212 and address reverser 220, allows counter bits to pass through unchanged for an MSB equal to logic 0, or swaps counter bit values for an MSB equal to logic 1. In other words, bits j and (m–j) for j a bit of address 214 are swapped by address reverser 220 responsive to an MSB signal 213 with a value of logic 1. For a radix-4 implementation, namely for k equal to 4, address reverser 220 may be implemented with multiplexers, as illustratively shown with reference to FIG. 4.

Figure 4:
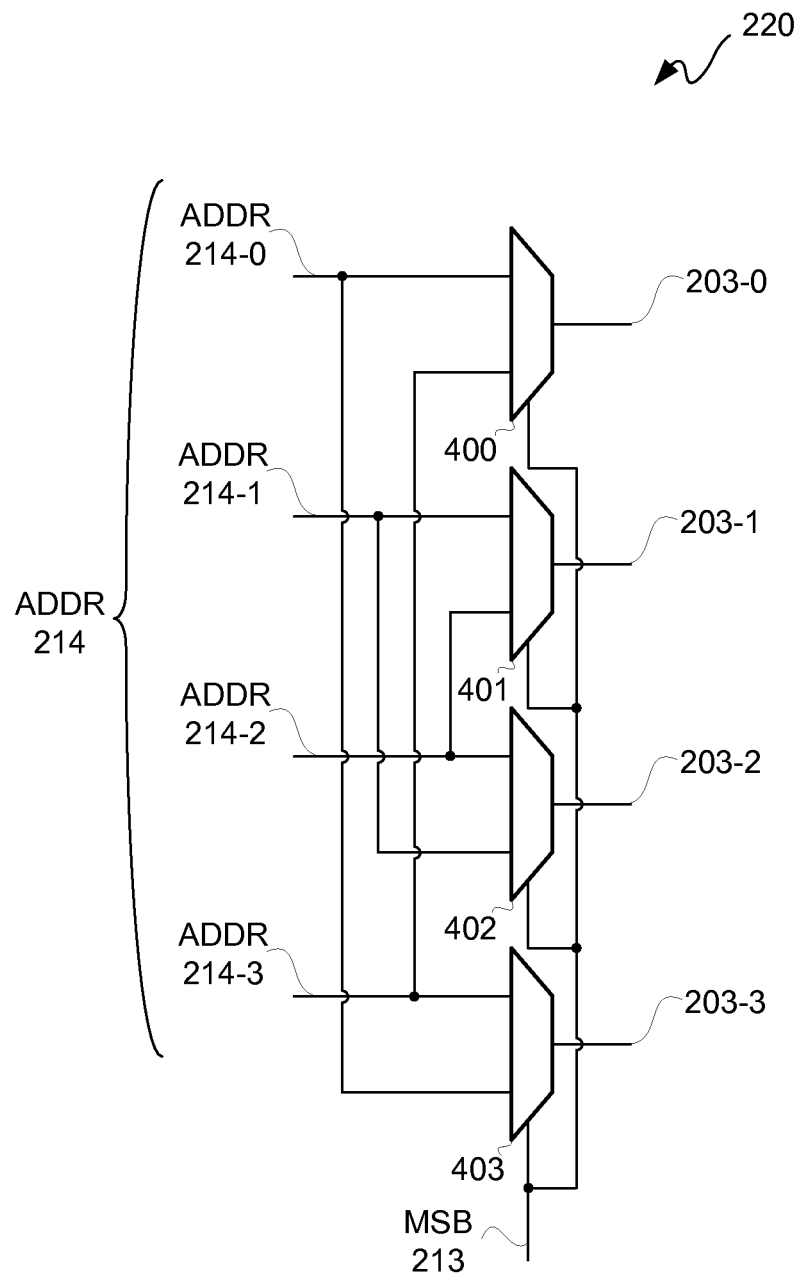
FIG. 4 is a circuit diagram depicting an exemplary embodiment of an address reverser of the data reorganizer of FIG. 2 for a radix-4 implementation.

FIG. 4 is a circuit diagram depicting an exemplary embodiment of an address reverser 220 for a radix-4 implementation. It should be appreciated, however, that other circuits may be used for circular shifting for commutators 210 and 230 of FIG. 3, as well as address reversing as described with reference to address reverser 220 of FIG. 4. With ongoing reference to FIGS. 2 and 4, address reverser 220 is further described.

Address 214 may include address inputs 214-0 through 214-3 corresponding to data inputs 201-0 through 201-3. Address input 214-0 is provided as a data input to multiplexers 400 and 403. Address input 214-1 is provided as a data input to multiplexers 401 and 402. Likewise, address input 214-2 is provided as a data input to multiplexers 401 and 402, and address input 214-3 is provided as a data input to multiplexers 400 and 403. MSB signal 213 is provided to each of multiplexers 400 through 403 as a control select signal. Accordingly, it should be appreciated that if MSB signal 213 is a logic 0, then address inputs 214-0 through 214-3 are respectively output as address outputs 203-0 through 203-3 respectively for RAMs 211-0 through 211-3. If, however, MSB signal 213 is a logic 1, then address inputs 214-3 through 214-0 are respectively output as address outputs 203-0 through 203-3, namely the output is bit-reversed from the input.

Thus, MSB signal 213 provided from counter 212 controls bit reverser logic, namely address reverser 220. The next k bits following the MSB from counter 212 are used for controlling commutators 210 and 230 using select signals 221 and 222 as previously described. The remaining bits of counter 212 may be used to generate base addresses for RAMs 211-0 through 211-3. More generally, an address for a RAM may be generated in accordance with Equation (1):

$$\text{addr}_i = \left\{ \text{bit\_reverse}(\text{addr}, MSB) - \frac{N}{k^2}i \right\} \bmod \frac{N}{k}, \quad (1)$$

where i for the embodiment of FIG. 2 is from 0 to (k–1). Equation (1) may be implemented in hardware by k-bit adders of adder block ("k-bit adder block") 251 as part of address generator 250. Such k-bit adder block 251 may be used to correct most significant digits of individual address outputs to RAMs 211-0 through 211-3 for odd-numbered frames, namely when MSB signal 213 is equal to a logic 1. For even-numbered frames, namely when MSB signal 213 is equal to a logic 0, then k-bit adder block 251 is transparent, namely in a bypass mode, as described below in additional detail with respect to FIG. 7.

Figure 7:
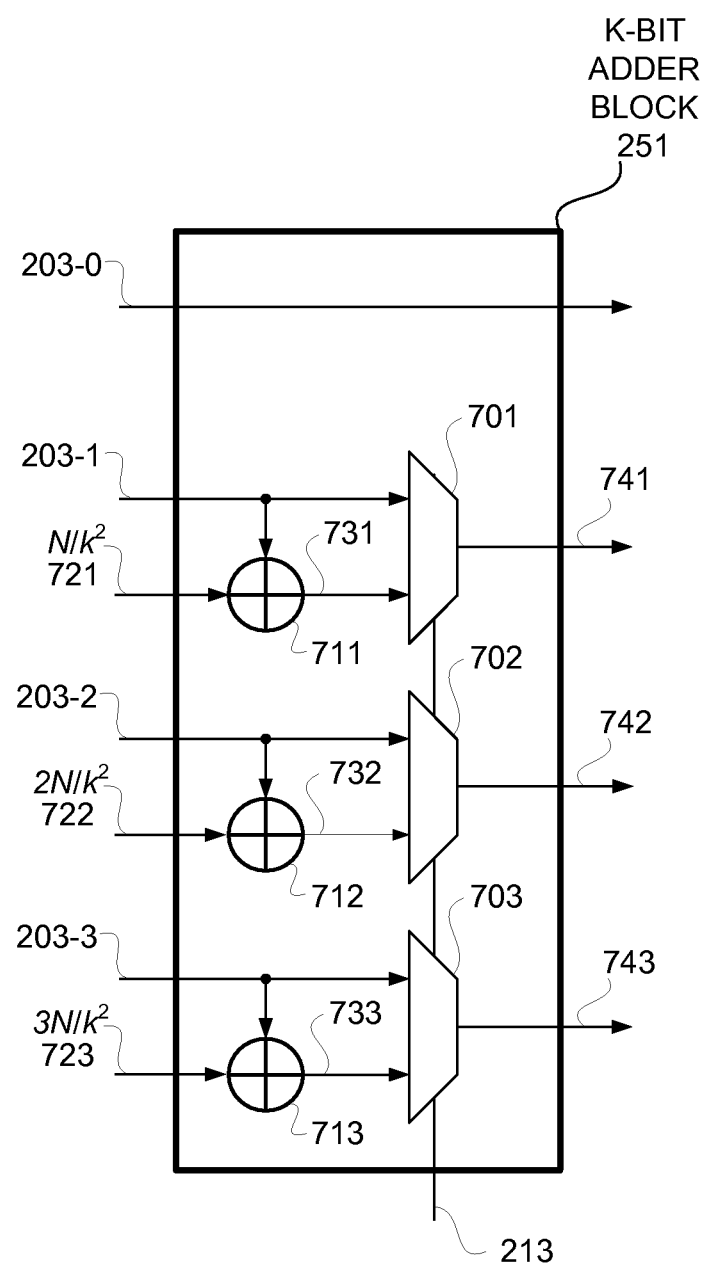
FIG. 7 is a circuit diagram depicting an exemplary embodiment of a k-bit adder block.

FIG. 7 is a circuit diagram depicting an exemplary embodiment of k-bit adder block 251. A k equal to 4 embodiment is illustratively shown; however, it should be understood that values of k other than 4 may be used.

MSB signal 213 is provided to multiplexers 701 through 703 of k-bit adder block 251 as a control select input. Address signals 203-1 through 203-3 are respectively input to multiplexers 701 through 703 and respectively input to k-bit adders 711 through 713. Another input to adders 711 through 713 are respective increments of $N/k^2$. More particularly, input to adders 711 through 713 respectively are inputs $N/k^2$ 721, $2N/k^2$ 722, and $3N/k^2$ 723. For the first or zero position, there is no adder, and thus address signal 203-0 is passed through k-bit adder block 251 without any refinement regardless of the value of MSB signal 213.

Address signal outputs 731 through 733 respectively of adders 711 through 713 are respectively input to multiplexers 701 through 703. Outputs of k-bit adder block 251 as associated with multiplexers 701 through 703 are illustratively shown as outputs 741 through 743, respectively.

For even-numbered frames, MSB signal 213 is equal to a logic 0, so address signals 203-1 through 203-3 are respectively selected by multiplexers 701 through 703 for output without any refinement. In other words, for MSB signal 213 equal to logic 0, k-bit adder block 251 is transparent, namely in a bypass mode. Thus, outputs 741 through 743 respectively are the same as address signals 203-1 through 203-3 in such bypass mode.

For odd-numbered frames, MSB signal 213 is equal to a logic 1, so address signals 731 through 733 are respectively selected by multiplexers 701 through 703 for output. Thus, outputs 741 through 743 are refined versions of address signals 203-1 through 203-3, respectively. This refinement is obtained by respective addition of $N/k^2$, $2N/k^2$, and $3N/k^2$ to addresses of address signals 203-1 through 203-3. Thus, outputs 741 through 743 respectively are an address of address signal 203-1 incremented by $N/k^2$, an address of address signal 203-2 incremented by $2N/k^2$, and an address of address signal 203-3 incremented by $3N/k^2$. For purposes of clarity and not limitation, outputs 741 through 743 are simply referred to hereinbelow as address signals 203-1 through 203-3.

Table 3 below is used to illustratively depict addresses 0 through 3 corresponding to address inputs 203-0 through 203-3 for respective input to RAMs 211-0 through 211-3 of FIG. 2. Accordingly, continuing the example of a radix-4 implementation, where k is equal to 4 and N is equal to 64, namely a 64-point implementation, MSB signal 213 is shown as being either a logic 0 or a logic 1 in Table 3 below. For a first five clock cycles in Table 3, natural order addressing is illustratively shown corresponding to MSB signal 213 being a logic 0. The first five clock cycles illustratively shown in Table 3, namely cycles 11 through 15, are for the last five clock cycles of an even-numbered frame, such as a "frame 0," and after those last five cycles of such even-numbered frame, a first eight cycles, namely clock cycles 0 through 7, of a subsequent odd numbered frame, such as a "frame 1," following after "frame 0" are illustratively shown in Table 3. It should be appreciated that "frame 0" is an even-numbered frame as indicated by MSB being a logic 0, and "frame 1" is an odd-numbered frame as indicated by MSB being a logic 1.

TABLE 3

| CLK | 11 | 12 | 13 | 14 | 15 | 0 | 1 | 2 | 3 | 4 | 5 | 6 | 7 |
|---|---|---|---|---|---|---|---|---|---|---|---|---|---|
| ADDR 0 | 11 | 12 | 13 | 14 | 15 | 0 | 1 | 2 | 3 | 12 | 13 | 14 | 15 |
| ADDR 1 | 11 | 12 | 13 | 14 | 15 | 4 | 5 | 6 | 7 | 0 | 1 | 2 | 3 |
| ADDR 2 | 11 | 12 | 13 | 14 | 15 | 8 | 9 | 10 | 11 | 4 | 5 | 6 | 7 |
| ADDR 3 | 11 | 12 | 13 | 14 | 15 | 12 | 13 | 14 | 15 | 8 | 9 | 10 | 11 |
| MSB | 0 | 0 | 0 | 0 | 0 | 1 | 1 | 1 | 1 | 1 | 1 | 1 | 1 |

For the read-out of an odd-numbered frame from memory, it should be appreciated that output is in digit-reversed order. Thus, for example, the first through fourth clock cycles for an odd-numbered frame, namely clock cycles 0 through 3, of Table 3 illustratively depict digit-reversed output for each column. However, it should be appreciated that, collectively, columns associated with the first through fourth cycles of an odd numbered frame have been ordered for parallel output by not shifting.

For the fifth through eighth clock cycles of an odd-numbered frame, namely clock cycles 4 through 7, of Table 3, it should be appreciated that MSB is still a logic 1, however, the data has been circularly shifted down one position. Though not illustratively shown in Table 3, for the next four clock cycles of such odd-numbered frame, another circular shift would be used and following those four clock cycles, another circular shift would be used on the next four clock cycles. Accordingly, it should be appreciated that by toggling between natural and digit-reversed order modes respectively for even- and odd-numbered frames, after a read out of a natural order frame, a digit-reversed ordered frame may be written to the same buffer space, and vice versa. In other words, as a column in Table 3 is read out using a first ordering, a second ordering may use that column, where the second ordering is different from the first ordering. Thus, if the ordering being read out is a digit-reversed ordering for a digit-reversed addressing mode, such column in Table 3 is available for being written in a natural order in the digit-reversed addressing mode, and vice versa. Thus a single memory buffer stage may be used.

Returning to FIG. 4 with ongoing reference to FIG. 2 as well, for a digit-reversed addressing mode for storing data indices in RAMS 211-0 through 211-3, MSB signal 213 is a logic 1 in the example of Table 3 for this storing. In this example embodiment, a logic 1 for odd-numbered frames and a logic 0 for even-numbered frames of MSB signal 213 are used; this may be reversed in other embodiments.

Assuming an odd-numbered frame is being stored in RAMs 211-0 through 211-3, address generator 250 in generating addresses 0 through 3 for address inputs 203-0 through 203-3, respectively, is in a digit-reversed addressing mode. In a digit-reversed addressing mode, outputs 229-0 through 229-3 respectively from RAMs 211-0 through 211-3 are provided as input to commutator 230. Outputs from RAMs 211-0 through 211-3 may thus correspond to previously stored data output (e.g., D0 through D3 of Table 2) from commutator 210, except that outputs from RAMs 211-0 through 211-3 are for a read cycle as opposed to a write cycle. Again, write enable signal 206 may be used to put RAMs 211-0 through 211-3 in either a read mode or a write mode.

Continuing the example, output sets of four samples may be circularly shifted or rotated by commutator 230 for providing outputs 231-0 through 231-3. For example, for data inputs 229-0 through 229-3 received in parallel by commutator 230, all four pieces of data, namely 0, 16, 32, and 48 as illustratively shown in a first column of Table 2, are stored in different RAMs, corresponding to RAMs 211-0 through 211-3; however, these four pieces of data are reorganized to appear on data output 0, namely data output 231-0. By driving commutator 230 responsive to a most significant digit of address 214 as indicated by select signal 222, commutator 230 restores the correct sample order for output via outputs 231-0 through 231-3.

Although the number of memory words minimally required to reorganize an N-point data set through k parallel channels may be slightly less than N, with increasing N values, the minimum memory that may be used converges toward N. Accordingly, for an N-point frame received through k parallel streams, the minimum amount of memory that can be used is lower bounded by $N-N^{0.7}$, which converges to N. Therefore, for large frame sizes, where efficiency may be a significant factor, the above-described architecture may be used.

Figure 5A:
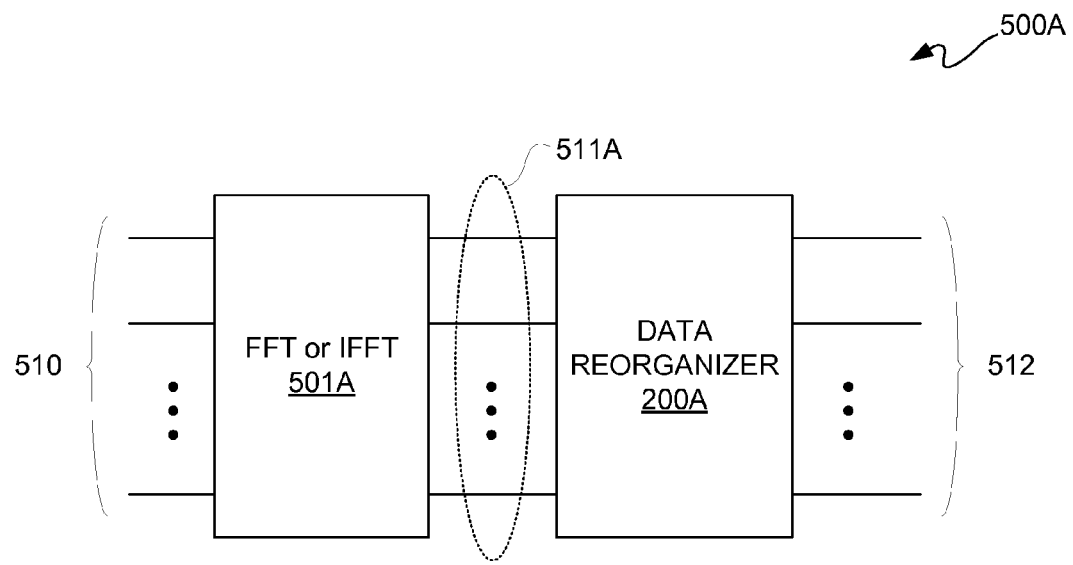
FIG. 5A is a block diagram depicting an exemplary embodiment of a Fast Fourier Transform ("FFT") or Inverse FFT ("IFFT") block.

FIG. 5A is a block diagram depicting an exemplary embodiment of an FFT or IFFT block 500A. Parallel inputs 510 are provided to an IFFT or FFT block 501A. Block 501A may be configured for DIF or DIT and for a radix-k operation. Parallel outputs 511A from block 501A are provided as inputs to a radix-k data reorganizer 200A. Parallel outputs 512 are output from data reorganizer 200A.

Block 500A is configured such that if inputs 510 are in natural order, then outputs 512 are put in natural order, and if inputs 510 are in digit-reversed order, then outputs 512 are put in digit-reversed order. Inputs 510 and outputs 512 are for frame-associated data.

Figure 5B:
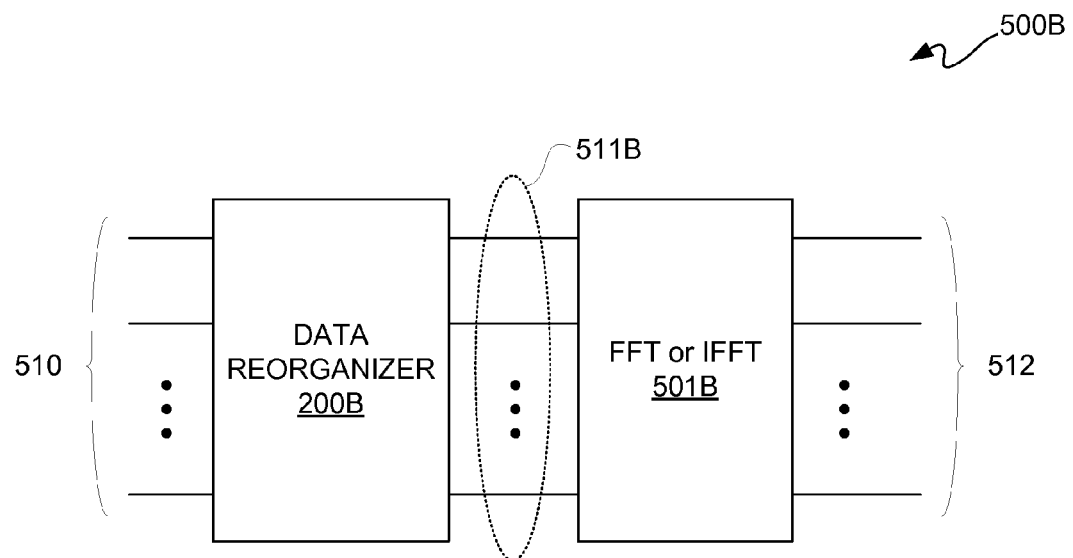
FIG. 5B is a block diagram depicting an exemplary embodiment of an alternative IFFT or FFT block 500.

FIG. 5B is a block diagram depicting an exemplary embodiment of an alternative IFFT or FFT block 500B. Block 500B is the same as block 500A, except that the position of data reorganizer 200B and IFFT or FFT block 501B have been switched such that parallel input 510 is initially provided to data reorganizer 200B. Output 511B from data reorganizer 200B is provided as input to IFFT or FFT block 501B and output 512 is provided from IFFT or FFT block 501. Again, order of input 510 may be natural or digit-reversed, and output 512 is put in an order corresponding to that of input 510 for frame data.

Figure 6:
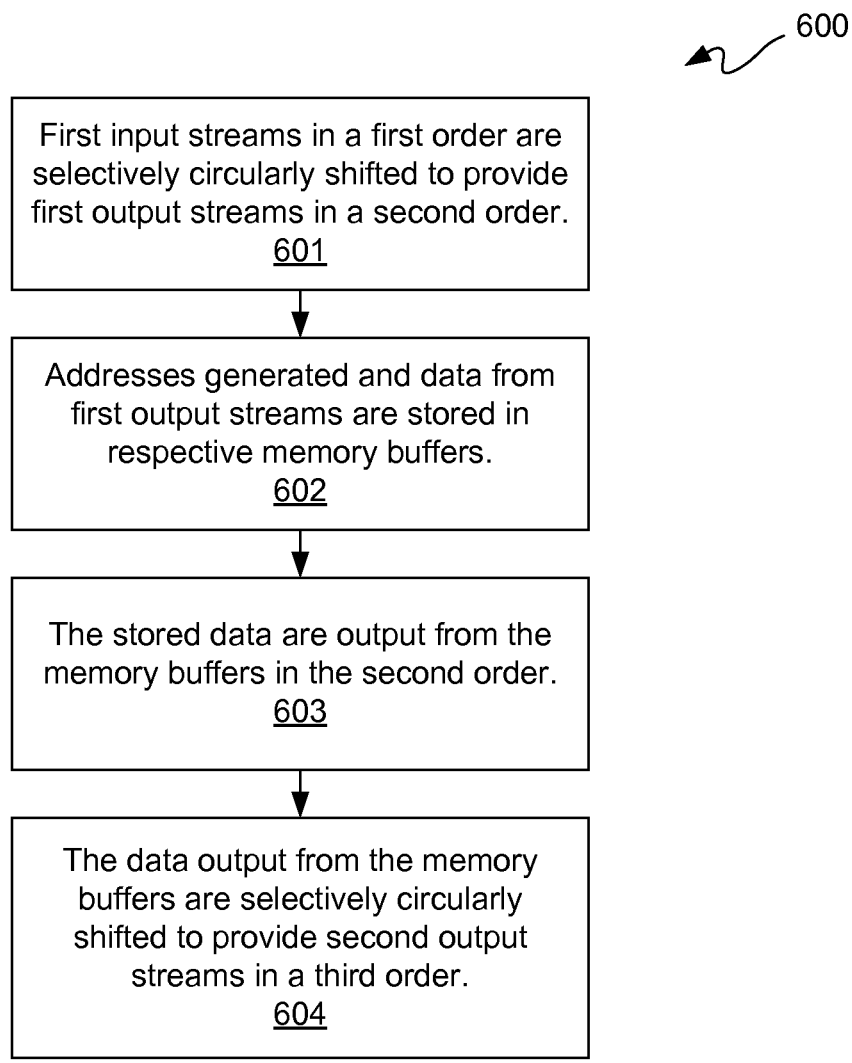
FIG. 6 is a flow diagram depicting an exemplary embodiment of a data reorganization flow.

FIG. 6 is a flow diagram depicting an exemplary embodiment of a data reorganization flow 600. At 601, first input streams having data in a first order are selectively circularly shifted to provide first output streams having the data in a second order. The first order may be a natural order and the second order may be a digit-reversed order, or vice versa; and bit-reversed order may be used instead of digit-reversed order. At 602, the data from the first output streams is stored in respective memory buffers for output in the second order in groups of the data. The data is stored in the memory buffers for output of each group in a single clock cycle.

At 602, addresses are generated for addressing the memory buffers for the storing of the data. The generating of addresses is in a first mode for odd-numbered frames and in a second mode for even-numbered frames for single stage buffering of parallel streams of the data in the memory buffers.

At 603, the data stored in the second order is respectively output in the groups from the memory buffers as second input streams. At 604, the second input streams are selectively circularly shifted to provide second output streams having the data in a third order.

The first order is a digit-reversed order for the data being for odd-numbered frames and a natural order for the data being for even-numbered frames. The second order is a shifted version of the first order. The third order is the natural order for the data being for the odd-numbered frames and the digit-reversed order for the data being for the even-numbered frames.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A data reorganizer, comprising:
   a first radix-k commutator for k a positive even integer greater than zero;
   wherein the first radix-k commutator is coupled to receive first parallel input streams to provide first parallel output streams;
   an address generator coupled to receive a clock signal and configured to generate select signals and address signals using the clock signal;
   memory buffers coupled to respectively receive the first parallel output streams from the first radix-k commutator and to respectively receive the address signals from the address generator;
   wherein the first parallel input streams have data in a first order;
   wherein the first radix-k commutator is coupled to receive a first select signal of the select signals and configured to reorder the first parallel input streams to rearrange the data via the first parallel output streams for segmented storage of the data in the memory buffers in a second order; and
   a second radix-k commutator coupled to receive second parallel input streams from the memory buffers to provide second parallel output streams;
   wherein the second radix-k commutator is coupled to receive a second select signal of the select signals and configured to reorder the second parallel input streams to rearrange the data via the second parallel output streams into a third order; and
   wherein the memory buffers form a single buffer stage between the first radix-k commutator and the second radix-k commutator.

2. The data reorganizer according to claim 1, wherein:
   the memory buffers are implemented with block random access memories of a programmable logic device; and
   the first radix-k commutator and the second radix-k commutator each being implemented using programmable logic of the programmable logic device.

3. The data reorganizer according to claim 1, wherein:
   the first order is a digit-reversed order;
   the second order is a shifted version of the digit-reversed order; and
   the third order is a natural order.

4. The data reorganizer according to claim 1, wherein:
   the first order is a natural order;
   the second order is a shifted version of the natural order; and
   the third order is a digit-reversed order.

5. The data reorganizer according to claim 1, wherein the address generator includes a counter, an address reverser, and adders.

6. The data reorganizer according to claim 5, wherein the counter is configured to provide a Most Significant Bit ("MSB") signal and an address signal to the address reverser.

7. The data reorganizer according to claim 6, wherein the address reverser is configured to reverse the address signal to provide the address signals responsive to a first state of the MSB signal and not to reverse the address signal to provide the address signals responsive to a second state of the MSB signal.

8. The data reorganizer according to claim 7, wherein:
   the adders are k-bit adders coupled to receive the address signals and configured to correct most significant digits of the address signals for respectively providing to the memory buffers for the MSB signal being in the first state; and
   the first state being associated with the data being for an odd-numbered frame.

9. The data reorganizer according to claim 8, wherein:
   the second state of the MSB signal is associated with the data being for an even-numbered frame;
   the data for the odd-numbered frame being received in the first order as a digit-reversed order and stored in the second order as a circularly shifted version of the digit-reversed order; and
   the data for the even-numbered frame being received in the first order as a natural order and stored in the second order as a circularly shifted version of the natural order.

10. The data reorganizer according to claim 1, wherein:
    the first order is a digit-reversed order for the data being for first frames and a natural order for the data being for second frames;
    the second order is a shifted version of the first order; and
    the third order is the natural order for the data being for the first frames and the digit-reversed order for the data being for the second frames.

11. The data reorganizer according to claim 10, wherein:
    the first frames are odd-numbered frames; and
    the second frames are even-numbered frames.

12. The data reorganizer according to claim 1, wherein the first radix-k commutator is further configured to:
    shift position of the first parallel output streams relative to the first parallel input streams responsive to a first subset of values associated with the select signals;
    pass the first parallel input streams without shifting to provide the first parallel output streams responsive to a second subset of the values associated with the select signals; and
    shift position of the second parallel output streams relative to the second parallel input streams responsive to the first subset of values associated with the select signals.

13. The data reorganizer according to claim 12, wherein:
    the second order is arranged for subsequent output of each segment of the data from the memory buffers in parallel in a clock cycle;
    the second radix-k commutator is further configured to pass the second parallel input streams without shifting to provide the second parallel output streams responsive to the second subset of the values associated with the select signals; and the second parallel input streams have data in the second order.

14. A method, comprising:

receiving first parallel input streams to a first radix-k commutator, for k a positive even integer greater than zero, for commutation to provide first parallel output streams;

wherein the first parallel input streams have data in a first order;

generating select signals and address signals by an address generator coupled to receive a clock signal;

storing the first parallel output streams from the first radix-k commutator in memory buffers using the address signals from the address generator;

receiving a first select signal of the select signals by the first radix-k commutator to reorder the data;

reordering the first parallel input streams by the first radix-k commutator to rearrange the data into a second order for the first parallel output streams for segmented storage of the data in the memory buffers;

receiving second parallel input streams from the memory buffers by a second radix-k commutator for commutation to provide second parallel output streams;

wherein the memory buffers form a single buffer stage between the first radix-k commutator and the second radix-k commutator;

receiving a second select signal of the select signals by the second radix-k commutator to reorder the data; and reordering the second parallel input streams by the second radix-k commutator to rearrange the data into a third order for the second parallel output streams.

* * * * *